United States Patent [19]
Chapman et al.

[11] Patent Number: 6,132,953
[45] Date of Patent: *Oct. 17, 2000

[54] COMBINATORIAL SYNTHESIS ON SOLUBLE POLYVALENT SUPPORTS HAVING A DISCRETE ARCHITECTURE

[75] Inventors: Kevin T. Chapman, Scotch Plains; Steven M. Hutchins, Somerville; Ronald M. Kim, Monmouth Junction; Mahua Manna, Woodbridge, all of N.J.

[73] Assignee: Merck & Co., Inc., Rahway, N.J.

[ * ] Notice: This patent is subject to a terminal disclaimer.

[21] Appl. No.: 08/884,893

[22] Filed: Jun. 30, 1997

Related U.S. Application Data

[60] Provisional application No. 60/021,033, Jul. 2, 1996, and provisional application No. 60/026,012, Sep. 12, 1996.

[51] Int. Cl.[7] .............................. C12Q 1/00; G01N 33/53
[52] U.S. Cl. .................... 435/4; 435/4; 435/7.1; 435/DIG. 48; 436/501; 436/536; 436/539; 530/338; 536/25.3
[58] Field of Search ........................ 435/7.1, 4, DIG. 48; 436/501, 536, 539; 530/338; 536/25.3

[56] References Cited

U.S. PATENT DOCUMENTS 5,877,214  3/1999  Kim .......................................... 514/571

FOREIGN PATENT DOCUMENTS 0 774 464  5/1997  European Pat. Off. .
WO 96/03418  2/1996  WIPO .

OTHER PUBLICATIONS

Kim, R.M., et al, *Chem. Abstracts,* vol. 125:300752 & *Proc. Natl. Acad. Sci.,* vol. 93(19), pp. 10012–10017, 1996.

Kim, R. "Solution–Phase Combinational Chemistry on Dendrimer Supports" in *Registration Bulletin* for "Randomn & Rational Drug Discover . . . " by Strategic Research Institute to be held Sep. 16–17, 1996.

Coe, D. "The use of Dendrimes as Soluble Supports" Abstract of Presentation at IBC Forum "Combinatgorial Technologies" held Oct. 23–24, 1997.

Mutter, M.; Hagenmaier, H.; Bayer, E., Angew. Chem., Int. Ed. Engl. (1971), vol. 10, 811.

Koster, H., Tetrahedron Lett. (1972), 1535.

Bayer, E.; Mutter, M. Nature (London) 1972, 237, 512.

Schott, H., Angew. Chem., Int. Ed. Engl. (1973), vol. 12, 246.

Andreatta, R.H./Rink, H., Helv. Chim. Acta (1973), vol. 56, 1205.

De Napoli, L.; Messere, A.; Montesarchio, D.; Piccialli, G.; Santacroce, C.; Bonora, G. M. Nucleosides Nucleotides (1993), vol. 12, 21.

Han, H.; Wolfe, M. M.; Brenner, S.; Janda, K. D., Proc. Natl. Acad. Sci. USA (1995), vol. 92, 6419.

Geckeler, K. E., Adv. Polym. Sci. (1995), vol. 121, 31.

Gravert, D. J.; Janda, K. D.; Chem. Rev. (1997), vol. 97, 489–509.

Seliger, H.; Aumann, G./Tetrahedron Lett. (1973), 2911.

*Primary Examiner*—Bennett Celsa
*Assistant Examiner*—Joseph W. Ricigliano
*Attorney, Agent, or Firm*—James L. McGinnis; David L. Rose

[57] ABSTRACT

The present invention is directed to the use of a soluble polyvalent support for the preparation of combinatorial libraries of compounds. The resultant combinatorial libraries are useful in screening for biologically active moieties in the drug discovery process or in developing compounds with desired physical and chemical properties.

24 Claims, No Drawings

COMBINATORIAL SYNTHESIS ON SOLUBLE POLYVALENT SUPPORTS HAVING A DISCRETE ARCHITECTURE

CROSS REFERENCE TO RELATED APPLICATIONS

This application is a non-provisional application based on Provisional Application Nos. 60/021,033, filed Jul. 2, 1996, and 60/026,012, filed Sep. 12, 1996, and claims priority from both of these applications.

BACKGROUND OF THE INVENTION

The standard method for searching for new chemical compounds which can effectively modulate biological processes employs the screening of pre-existing compounds in assays which have been designed to test particular properties of the compound being screened. Similarly, in designing compounds having desired physiochemical properties for general chemical applications, numerous compounds must be individually prepared and tested.

To reduce the time and expense involved in preparing and screening a large number of compounds for biological activity or for desirable physiochemical properties, technology has been developed for providing libraries of compounds for the discovery of lead compounds. Current methods for generating large numbers of molecularly diverse compounds focus on the use of solid phase synthesis. The generation of combinatorial libraries of chemical compounds by employing solid phase synthesis is well known in the art. For example, Geysen, et al. (*Proc. Natl. Acac. Sci. USA*, 3998 (1984) describe the construction of multi-amino acid peptide libraries; Houghton, et al. (*Nature*, 354, 84 (1991) and PCT Patent Pub. No. WO 92/09300) describe the generation and use of synthetic peptide combinatorial libraries for basic research and drug discovery; Lam, et al. (*Nature*, 354, 82 (1991) and PCT Patent Pub. No. WO 92/00091) describe a method of synthesis of linear peptides on a solid support such as polystyrene or polyacrylamide resin.

The growing importance of combinatorial chemistry as an integral component of the drug discovery process has spurred extensive technological and synthetic advances in the field (Thompson, L. A.; Ellman, J. A. (1996) *Chem. Rev.* 96, 555–600). Founded in peptide synthesis devised by Merrifield, solid phase chemistry has emerged as the pre-eminent method for construction of small molecule combinatorial libraries (see e.g. Merrifield, R. B. (1963) *J. Am. Chem. Soc.* 85, 2149–2154; (a) Terrett, N. K.; Gardner, M.; Gordon, D. W.; Kobylecki, R. J.; Steele, J. (1995) *Tetrahedron* 51(30), 8135–8173. (b) Gordon, E. M.; Barrett, R. W.; Dower, W. J.; Fodor, S. P. A.; Gallop, M. A. (1994) *J. Med. Chem.* 37, 1385–1401.).

It is known that a wide variety of organic reactions can be carried out on substrates immobilized on resins. These include, in addition to peptide synthesis, nucleophilic displacements on benzylic halides, halogenation, nitration, sulfonation, oxidation, hydrolysis, acid chloride formation, Friedel-Crafts reactions, reductions, metallation, and the like which are well known in the art. (See for example, Mathur, et al., "Polymers as Aids in Organic Chemistry", Academic Press, New York, 18 (1980) and Farrall, et al.,*J. Org. Chem.*, 41, 3877 (1976); "Solid Phase Organic Chemistry (SPOC)" and "Solid Phase Inorganic Chemistry (SPIC)", Chiron Mimotopes, pp. 1–31 (August 1995).

One variant on the use of substrates imobilized on resin beads employs polystyrene pins as supports for the substrates (see Geysen, et al., *J. Immunol. Meth.*, 102, 259 (1987) and another variant employs a flat solid support in the form of a tape or a streamer (see PCT Patent Publication WO 96/16078, published May 30, 1996).

Although combinatorial chemistry may be attempted by employing traditional synthetic chemistry in the solution phase, this is essentially impractical due to the difficulty in separating complex mixtures of intermediates and final compounds from reagents and solvents. Traditional solution phase chemistry has been criticized as being unsuitable as a technique which aims to simultaneously produce a multiplicity of new products, since this would not allow physical separation among the different products. The products are therefore likely to be contaminated with excess reagents, by-products, etc., leading to difficulties in separation and purification.

Central to the power of solid phase synthesis is the ease by which reagents and solvents are removed simply by washing. This allows for the purification of resin-bound mixtures of great complexity, and the use of large reagent excesses to drive reactions to completion. The "infinite dilution" obtained on solid supports can also prevent side reactions which may occur in solution. Despite its advantages, nontrivial liabilities are associated with solid phase synthesis. Most notable is the often arduous task of modifying solution phase chemistry to the solid phase, with its potential pitfalls such as poor solvation, differential site accessibility, and incompatibility of the polymer support with reagents or reaction conditions. Often the most time-consuming aspect of combinatorial library synthesis is not construction of the library itself, but rather translation of solution phase chemistry to the solid phase. Although a significant portion of organic chemistry can be adapted to synthesis on the solid phase, some reactions, such as heterogeneous catalysis, would be exceedingly difficult to conduct on reagents linked to a solid phase support. In addition to synthetic complications which may arise from employing a solid support, few analytical techniques exist for characterization of resin-bound compounds. Even if NMR or IR analytical methods are attempted, they are impractical because the resultant spectra are generally of such low quality. Thus, it is very difficult to monitor reactions conducted on solid phase. Even analysis of cleaved intermediates can be ambiguous, since the harsh cleavage conditions that are often required may be detrimental to the molecules of interest.

Accordingly, alternative methodology for the preparation of combinatorial libraries which overcomes the drawbacks of solid phase synthesis would provide a significant advance in the field.

Classical solution phase techniques have been developed in an attempt to overcome the drawbacks of solid phase synthesis. One approach is to separate acidic and basic reagents from the resultant products by adding a water solution of additional acids or bases (See Boger, et al,*J. Am. Chem. Soc.*, (Feb. 28, 1996)). A variant of this method takes advantage of extraction of the reagents or products into a perfluorocarbon solvent.

Another approach, termed liquid-phase combinatorial synthesis (LPCS), in which combinatorial libraries are synthesized on soluble polyethylene glycol (PEG) supports has been recently described (Han, H., Wolfe, M. M., Brenner, S., Janda, K. D. (1995) *Proc. Natl. Acad. Sci. USA* 92, 6419–6423; EPO Patent Publication No. EP 0,772,623 (May 14, 1997)). In this method, monofunctional PEG which falls within a certain molecular weight range is used as a support for synthetic reactions. When the reactions are complete, ether is added to the solution which causes precipitation of the PEG, which is then isolated by filtration. This precipitation/crystallization of the PEG-protected molecules from ether allows for removal of reagents and solvents by filtration, thus combining the advantages of solution phase chemistry and the utility of solid phase purification. This technology has been reviewed in *Science*, 272, 1266–1268 (May 31, 1996).

The use of a soluble polyvalent support in accordance with the present invention provides significant advantages with respect to solid phase synthesis of combinatorial libraries, including: (1) solution phase synthesis obviates the need to modify chemistry to the solid phase; (2) intermediates may be routinely characterized by a variety of analytical methods, including $^1$H and $^{13}$C NMR, IR, UV and mass spectrometry, with the generation of spectra of generally high resolution through NMR being made possible; (3) because multiple copies of each molecule are synthesized per polyvalent support, extremely high loadings may be attained; (4) size-based purification is general, since it does not rely on other physical differences between support-bound compounds and reagents; the use of large reagent excesses are also permitted; and (5) polyvalent supports offer a flexible framework that may be engineered to exhibit properties necessary for their desired applications. Accordingly, combinatorial chemistry on soluble polyvalent supports provides a valuable alternative to solid phase synthesis.

SUMMARY OF THE INVENTION

The present invention provides novel methodology for the preparation of a combinatorial library of compounds by means of a soluble polyvalent support. The use of a soluble polyvalent support for the preparation of a combinatorial library facilitates the use of standard solution phase chemistry, and allows homogeneous purification, routine characterization of intermediates, and high support loading.

The present invention is further directed to a combinatorial library of compounds wherein the combinatorial library is prepared by a process which employs a soluble polyvalent support. The present invention further embraces a combinatorial library of compounds which comprises a plurality of compounds attached to soluble polyvalent supports.

The present invention overcomes the difficulties inherent in solid phase synthesis of combinatorial libraries by providing a novel and widely applicable approach toward the prepartion of combinatorial libraries which combines the flexibility of classical solution phase synthesis with facile homogeneous purification. In addition, contrary to solid phase synthesis the present invention allows the routine and nondestructive characterization of reaction intermediates.

DETAILED DESCRIPTION OF THE INVENTION

The present invention is directed to a process for the preparation of a combinatorial library which employs a soluble polyvalent support.

In one embodiment, the present invention is directed to a process for the preparation of a compound which comprises:

(a) attaching a first synthon to a soluble polyvalent support to form a support-bound synthon;

(b) separating the support-bound synthon from the reaction media;

(c) reacting the support-bound synthon with another synthon to form a support-bound product; and (d) separating the support-bound product from the reaction media.

Optionally, the above process further comprises the step of (e) cleaving the product from the soluble polyvalent support. Optionally, such process further comprises the step of (f) separating the cleaved product from the soluble polyvalent support.

In a preferred embodiment, the present invention is directed to a process for the preparation of a combinatorial library of compounds which comprises:

(a) attaching a first synthon to a soluble polyvalent support to form a support-bound synthon;

(b) separating the support-bound synthon from the reaction media;

(c) mixing the support-bound synthon with one or more different support-bound synthons to form a pool of support-bound synthons;

(d) reacting the support-bound synthon with another synthon to form a support-bound product; and (e) separating the support-bound product from the reaction media.

Optionally, the above process further comprises the step of (f) cleaving the product from the soluble polyvalent support. Optionally, such process further comprises the step of (g) separating the cleaved product from the soluble polyvalent support.

In the above process, it will be readily apparent to one skilled in the art that steps (b) through (e) inclusive may be repeated multiple times to give products incorporating numerous synthons.

It is noted that in the above process, the order of steps (b) and (c) optionally may be interchanged.

In a preferred embodiment of the present invention, the soluble polyvalent support is separated from the solvents and reagents in the reaction media by ultrafiltration, gel permeation chromatography (GPC), size exclusion chromatography, precipitation, centrifugation, dialysis or selective adsorption. In a more preferred embodiment, the soluble polyvalent support is separated by ultrafiltration or size-exclusion chromatography.

The present invention is further directed to a combinatorial library wherein the combinatorial library is prepared by employing a soluble polyvalent support.

Accordingly, the present invention further embraces a combinatorial library which comprises a plurality of compounds attached to soluble polyvalent supports.

The present invention is further directed to a kit for combinatorial synthesis which comprises a soluble polyvalent support.

As outlined schematically in Scheme 1, a soluble polyvalent support may be employed analogously to a solid phase support in traditional combinatorial synthesis, except that reactions are performed in solution, and intermediates bound to the polyvalent supports are separated by methods such as ultrafiltration, size exclusion chromatography (GPC), precipitation, centrifugation, dialysis or selective adsorption, and especially size-selective methods such as gel permeation chromatography (GPC) or ultrafiltration. As will be clear to one skilled in the art, the steps may be repeated iteratively to incorporate additional synthons (C, D, etc) into the target compound (i.e. A-B-C-D, . . . etc.).

SCHEME 1

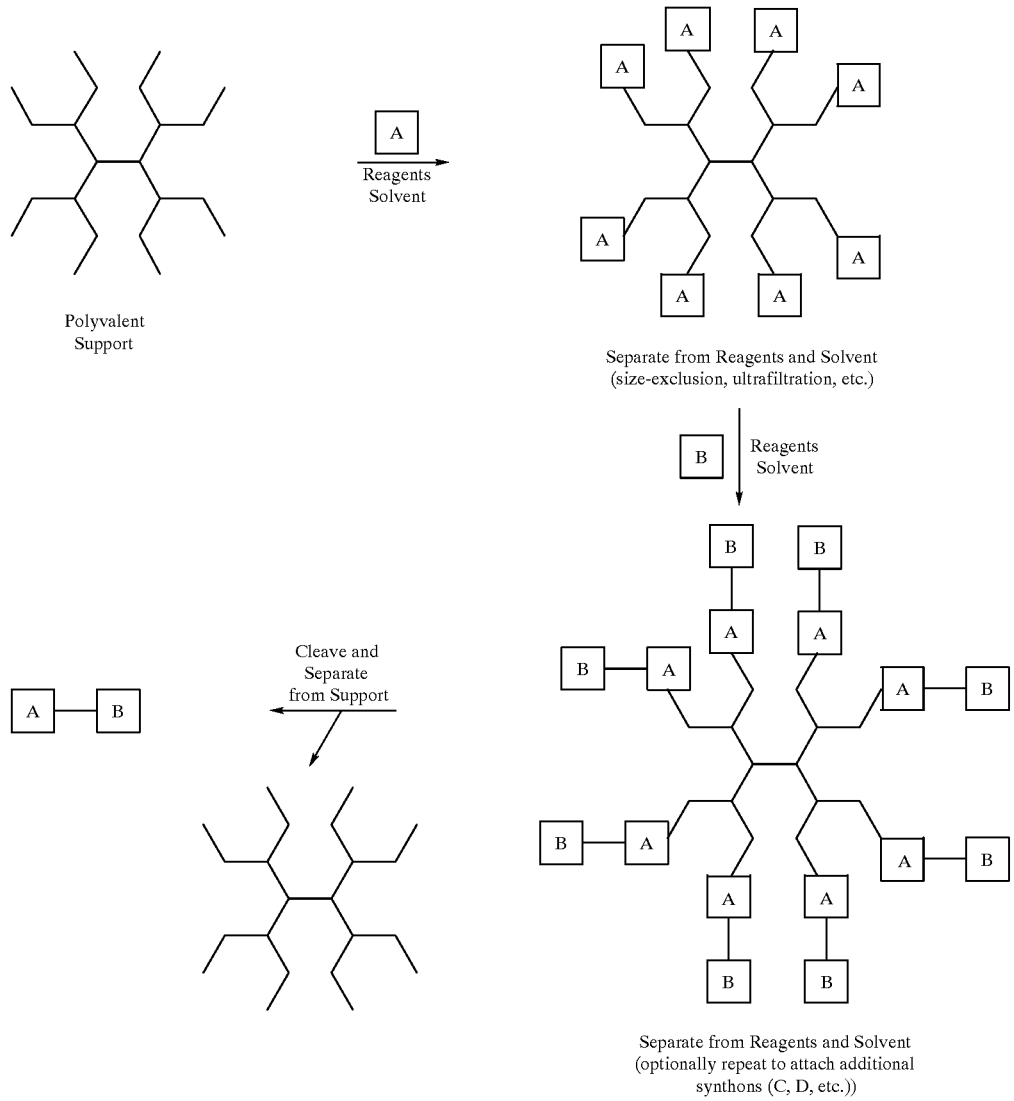

By the term "polyvalent support" is meant any molecular entity of discrete and characterizable molecular architecture which possesses multiple sites permitting the covalent attachment of synthons.

By the term "soluble" is meant that the polyvalent support is dissolved in the appropriate solvent selected for the reaction media or subsequent manipulations. For examples, polyvalent supports with very hydrophobic interiors and hydrophilic surfaces are water-soluble (e.g., Starburst polyether dendrimers), whereas polyvalent supports with hydrophilic interiors and hydrophobic surfaces are hydrocarbon-soluble (e.g. Starburst PAMAM dendrimers). If desired, the polyvalent support may be soluble in the reaction media and insoluble in the solvents employed in a subsequent manipulation to facilitate isolation of the support by e.g. precipitation.

By the term "synthon" is meant any chemical moiety which may be synthetically manipulated to permit its covalent linking to a support or to another synthon. To facilitate the separation of the synthon from the polyvalent support it is preferred that the synthon be attached via a chemically cleavable linker. Upon cleavage from the support, the linked synthons comprise discrete molecular entities which may be analyzed for their biological activity or physiochemical properties, or which may be subjected to further chemical modification.

As used herein, the generic depiction of a polyvalent support

"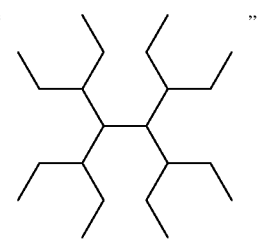"

is not intended to represent any specific arrangement of carbon atoms, but is merely a graphical representation of the underlying molecule which representation is employed for convenience and to facilitate ready comprehension of the essential features of the present invention.

The term "polyvalent support" as used herein is intended to include the single trunked two dimensional projections which resemble a tree and are referred to as "dendrons" as well as an assembly of multiples of dendrons around a central core to form a three dimensional projection which are referred to as "dendrimers."

Preferred supports include: dendrimers, dendrons, cascade polymers, arborols, oligomers, blocked copolymers, branched macromolecules and the like. More preferred polyvalent suppports include dendrimers, dendrons, cascade polymers, and arborols. Especially preferred polyvalent supports are dendrimers or dendrons.

Polyvalent supports may be prepared by methods well known in the art, such as disclosed in e.g. U.S. Pat. Nos. 4,435,548; 4,472,509; 4,507,466; 4,558,120; 4,568,737; 4,587,329; 4,606,907; 4,631,337; 4,634,586; 4,675,173; 4,694,064; 4,737,550; 4,824,659; 4,857,599; 4,871,779; 4,916,246; 4,980,148; 5,021,236; 5,039,512; 5,041,516; 5,136,014; 5,183,862; 5,196,502; 5,225,522; 5,227,462; 5,338,532; 5,362,843; 5,418,301; Tomalia et al, *Polymer Journal,* 17 (1), 117–132 (1985); Kim et al, *Polymer Preprints,* 29 (2) 310 (1988); Aharoni et al, *Macromolecules,* 15, 1093 (1982); Tomalia et al, *Macromolecules,* 19 (9), 2466–2468; *J. Org. Chem.,* 50, 2044 (1985); Newkome et al, *J. Chem. Soc. Chem. Commun.,* 752 (1986); Newkome et al, *J. Am. Chem. Soc.,* 108, 849 (1986); *J. Org. Chem.,* 52, 5305–5312 (1987); Tomalia et al, *Angew. Chem. Int. Ed. Engl.,* 29, 138–175 (1990); Newkome, et al, *Aldrichimica Acta,* 25 (2), 31–38 (1992); *J. Chem. Soc. Perkin Trans.,* 2459–2469 (1992); *Macromolecules,* 26, 4617–4623 (1993); Tomalia, et al, *Top. Curr. Chem.,* 165 (Supramolecular Chemistry I), 193–313 (1993); and references cited therein.

In a preferred embodiment, the soluble polyvalent support is a soluble dendrimer support. This terminology includes dendritic polymers in which a branched oligomer is built generationally from a central initiator core.

Dendrimers are generally classified as branching oligomers which are built generationally from a central core (see e.g. (a) Buhlein, B.; Wehner, W.; Vogtle, F. (1978) *Synthesis,* 155–158. (b) Tomalia, D. A.; Naylor, A. M.; Goddard, W. A. III. (1990) *Angew. Chem. Int. Ed.* 29, 138–175. (c) Fréchet, J. M. J. (1994) *Science* 263, 1710–1715. (d) Mekelburger, H.-B.; Jaworek, W.; Vogtle, F. (1992) *Angew. Chem. Int. Ed.* 31, 1571–1576). Unlike typical polymers, dendrimers are characterized by discrete, controllable molecular architectures. In particular, low generation dendrimers exist in extended form, promoting high reagent accessibility (Mourey, T. H.; Turner, S. R.; Rubinstein, M.; Fréchet, J. M. J.; Hawker, C. J.; Wooley, K. L. (1992) *Macromolecules* 25, 2401–2406).

A preferred soluble dendrimer support is a "starburst" or "cascade" dendrimer which is a three-dimensional, highly ordered oligomeric or polymeric compound formed by reiterative reaction sequences starting from a smaller molecule which acts as an initiator core.

Preferred soluble dendrimers include poly(amidoamines), poly(alkyleneimines), poly(amides), poly(amido alcohols), poly(arenes), poly(arylesters), poly(siloxysilanes), poly (imidaxo[1,2-a][1,3,5]triazines), poly(haloalkylaryl ethers), poly(arylalkyl ethers), poly(arylesters), poly(arylene), poly (arylacetylenes), poly(aryl/azacrown ethers), and the like.

An especially preferred soluble dendrimer for use in the present invention is Starburst™ polyamidoamine (PAMAM) Generation 1 (Tomalia, et al, *Polymer Journal,* 17 (1), 117–132 (1985)). PAMAM is commercially available and is highly symmetric, which provides uniform site accessibility and facilitates NMR interpretation, and the eight amine-terminated "arms" may be readily functionalized.

In the present invention, the soluble polyvalent support possess a functional group which facilitates attachment of another molecule to the soluble dendrimer support. By "functional group" as used herein is meant any moiety which enables the covalent bonding between the dendrimer and the desired reagent. Such functional groups include alcohols, amines, halides, thiols, esters, sulfonates, amides, carboxylates, nitrites, phenols, silanes, activated alkenes, and the like. For example, in the case of reaction with an electrophilic reagent, an amino functional group may be employed. In the case of reaction with a nucleophilic reagent, an ester, tosylate or halide may be used.

Although in the case of dendrons, such functional group may be present on the initiating core itself, to facilitate high loading of the dendrimer, it is preferred that the functional group be present on an accessible position of the dendrimer, particularly on the outer surface of the dendrimer.

Preferably, the polyvalent support is provided with an existing functional group; However, if the polyvalent support does not contain a functional group, it may be reacted under methodology well known in the art to introduce the desired functional group.

The present invention envisions the use further modification of the present soluble polyvalent supports to facilitate manipulation and/or identification. Accordingly, the present invention is further directed to compounds wherein the compound of Formula I, II or III is covalently attached to a handle or linker functionality which facilitates the manipulation of the support or which acts as an anchor to facilitate the attachment of compounds thereto. Such handles or linkers include those which are known for use in solid phase synthesis, including 2,4-dimethoxy-4'-hydroxy-benzophenone, 4-(4-hydroxymethyl-3-methoxyphenoxy)-butyric acid (HMPB), 4-hydroxymethylbenzoic acid, 4-hydroxymethyl-phenoxyacetic acid, 3-(4-hydroxymethylphenoxy)-propionic acid, p-[(R,S)-α-[1-(9H-fluoren-9-yl)methoxyformamido]-2,4-dimethoxy-benzyl]-phenoxyacetic acid, p-chloromethylphenyl linker, p-hydroxymethylphenyl linker, MBHA linker, HMBA-MBHA linker, Wang linker, Nova Syn TGA linker, Rink acid linker, Rink amide linker, Rink amide MBHA linker, Sieber linker, trityl linker, and the like.

In addition, the present invention is further directed to compounds wherein the compound of Formula I, II or III is attached to functionality which acts as a label or tag to facilitate the identification or characterization of the support (and any compounds attached thereto). Such labels or tags include chemical or radiochemical moieties which are capable of being distinguished from other chemical moieties and which are capable of being detected at low levels (such as at $10^{-18}$ to $10^{-19}$ mole), such as fluorescent labels. Representative tags include those disclosed in PCT Patent Publications WO 95/16209 and WO 95/28640.

In a preferred embodiment, the present invention is directed to a process which is conducted by automation or under computer control, since both the synthesis and purification steps are performed in solution.

In the present invention, the polyvalent support may be separated from solvents and reagents or otherwise purified by methods known in the art including, crystallization, precipitation, ultrafiltration, gel permeation chromatography (GPC), size exclusion chromatography, precipitation, centrifugation, dialysis or selective adsorption. Preferred methods include ultrafiltration, size exclusion chromatography (GPC), precipitation, centrifugation and selective adsorption, in which the most preferred methods include ultrafiltration and size-exclusion chromatography.

The extremely high loadings capable on polyvalent supports greatly facilitates the production of multimilligram quantities of compounds. The ability to achieve high support loading increases efficiency by diminishing the physical size of the reactor which is required for the preparation of useful amounts of the desired compounds.

A combinatorial library is a collection of compounds in which the compounds comprising the collection are composed of one or more subunits or monomeric units (i.e. synthons). The subunits may be selected form natural or unnatural moieties including amino acids, nucleotides, sugars, lipids, carbohydrates, dienes, dienopholes, and the like. The compounds of the combinatorial library differ in one or more ways with respect to the type(s), number, order or modification of the subunits comprising the compounds.

The combinatorial libraries generated by the methods of the present invention may be screened for pharmacologically or diagnostically useful compounds, as well as for desired physical or chemical properties. It will be clear to one skilled in the art that such screening may be conducted on a library of compounds which have been separated from the polyvalent support, or may be conducted directly on the library of compounds which are still linked to the polyvalent support.

The present invention provides a general method by which any variety of single compounds or libraries may be created. Furthermore, polyvalent supports present a modular framework which can be custom-tailored so as to be applicable to a variety of synthetic methodologies.

The present invention is useful for developing new drugs and chemical entities. The invention is useful for rapidly generating and systematically synthesizing large numbers of molecules that may vary in their chemical structure or composition. The invention is further useful for randomnly generating a large number of candidate compounds, then later optimizing those compounds which exhibit the most desirable properties.

As will be readily apparent to one skilled in the art, the present invention has application in essentially any synthetic reaction which may be conducted in the solution phase. Thus, the present invention is useful in almost all of the synthetic reactions which are known to one of skill in the art, including peptide synthesis, acylation, alkylation, condensation, cyclization, halogenation, heterogeneous catalysis, hydrolysis, metallation, nitration, nucleophilic displacement, organometallic reactions, oxidation, reduction, sulfonation, acid chloride formation, Diels-Alder reaction, Friedel-Crafts reactions, Fischer indole synthesis, Michael reactions, and the like (see e.g., H. O. House, "Modern Synthetic Reactions", 2nd ed. (Benjamin/Cummings, Menlo Park 1972); J. March, "Advanced Organic Chemistry", 3rd ed., (John Wiley & Sons, New York, 1985); Fieser and Fieser, "Reagents for Organic Synthesis", Volumes 1-end (Wiley Interscience, New York)).

Likewise, the present invention has application in essentially any synthetic reaction which may be conducted on solid phase supports, including acetal formation, alkylations, alkynation, chiral alkylation, reductive alkylation, carbanion reactions, Grignard reactions, ortanocadmium/manganese reactions, organolithim reactions, organozinc reactions, carbene insertion, condensations, Claisen reactions, aldol reactions, Dieckmann cyclization, Knoevenagel condensations, Mannich reactions, cycloadditions, cyclizations (in particular to form heterocyclic rings), Friedel-Crafts reactions, halogenation, bromination, chlorination, nucleophilic addition, Michael addition, aromatic nucleophilic substitution, Finkelstein reaction, Mitsunobu reaction, palladium (0) catalyzed reactions, Stille coupling, Suzuki coupling, Heck reaction, carbamate/urea formation, oxidation of primary alcohol to aldehyde, Sharpless reaction, oxidation of secondary alcohol to ketone, oxidation of aldehyde to carboxylic acid, epoxidation, oxidation of primary chloride to aldehyde, oxidative phenol coupling, reduction of acid to alcohol, reduction of aldehyde to alcohol, reduction of alkyne to alkene, reduction of amide to amine, reduction of aryl nitro to amine, reduction of azide to amine, reduction of ester to alcohol, reduction of imine to amine, reduction of iodide to alkyl, reduction of ketone to alcohol, Wittig reaction, Horner-Emmons condensation, and the like (see generally, "Solid Phase Organic Chemistry (SPOC)" and "Solid Phase Inorganic Chemistry (SPIC)", Chiron Mimotopes, pp. 1–31 (August 1995).

To demonstrate the feasibility of using soluble polyvalent supports for combinatorial chemistry, single compounds and a combinatorial library were prepared via the Fischer indole synthesis and by heterogeneous catalysis by employing a dendrimer support. Excellent product yields and purities were obtained, and dendrimer-protected intermediates could be routinely analyzed by $^1$H and $^{13}$C NMR, and mass spectrometry. The results indicate that use of soluble polyvalent supports provides a general and efficient strategy for the generation of combinatorial libraries.

As an example of the present invention, soluble polyvalent supports may be employed for indole formation via the Fischer indole synthesis. Due to the biological and pharmacological significance of indoles, their construction has been actively pursued in the art (Robinson, B. (1982) *The Fischer Indole Synthesis;* John Wiley & Sons: New York). Because strongly acidic conditions are required for cyclization, a base-labile handle was used to anchor compounds onto a dendrimer support. Thus, PAMAM-HMB 1 was synthesized by attaching 4-hydroxymethyl-benzoic acid to PAMAM using standard carbodiimide coupling conditions. 4-Hydroxymethylbenzoic acid may be obtained commercially or may be prepared essentially as described by Atherton, E.; Logan, C. L.; Sheppard, R. C. (1981) *J. Chem. Soc., Perkin Trans. I,* 538–546. Similarly, soluble polyvalent supports may be employed in heterogeneous catalysis. Heterogeneous catalysis is exceedingly difficult to conduct on reagents linked to a solid phase support, but is accomplished readily by employing a soluble polyvalent support.

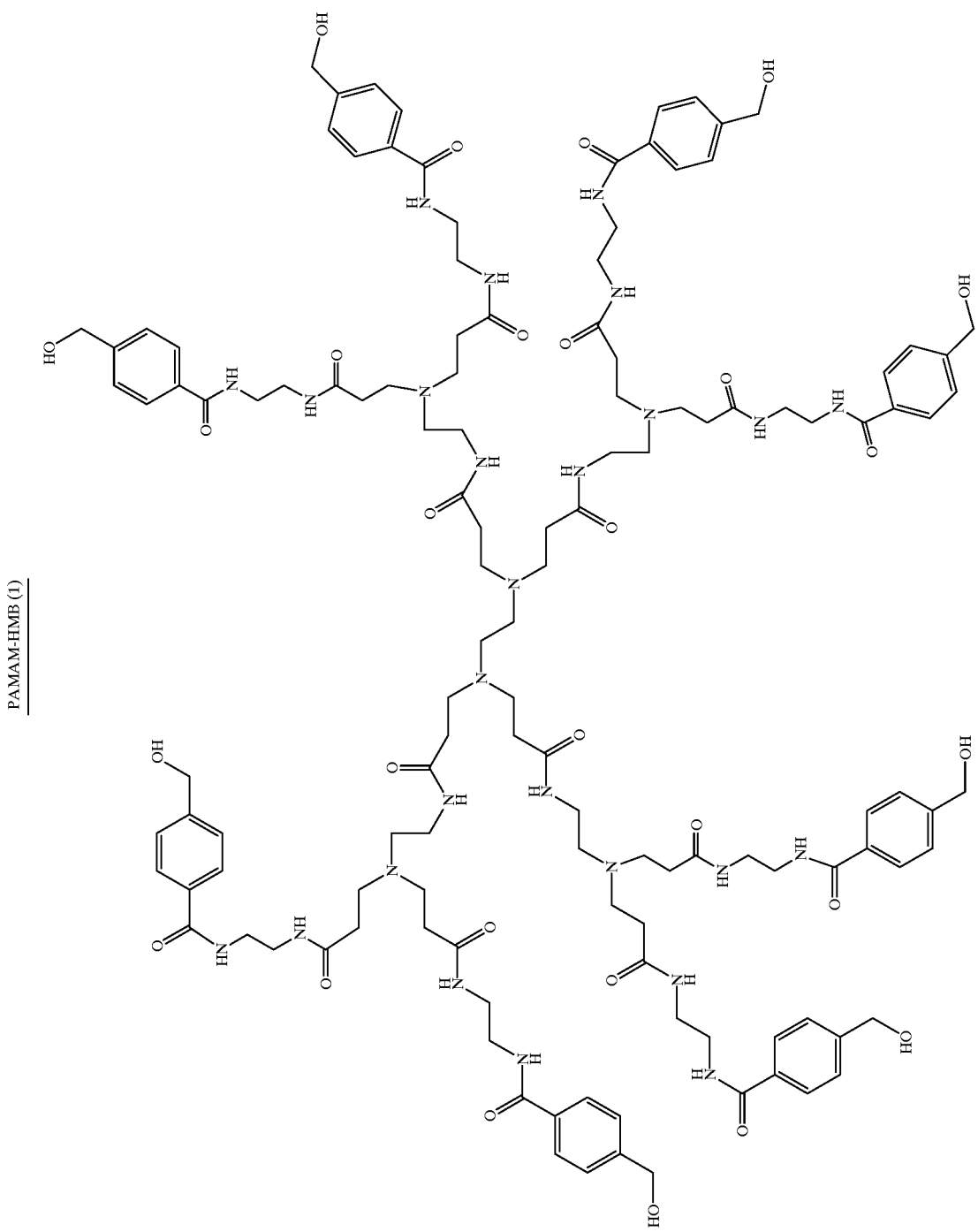
PAMAM-HMB (1)

Purification of PAMAM-HMB 1 (poly(amidoamino)-p-(hydroxymethyl)benzamide dendrimer) was performed by GPC on Sephadex® LH-20, and the dendrimer was characterized by $^1H$ and $^{13}C$ NMR, and mass spectrometry. Note that each PAMAM-HMB hybrid contains eight cleavable attachment sites for compound synthesis.

Single Compound Synthesis on Polyvalent Supports

An illustrative example of the instant invention is provided by the indole construction involved in the preparation of compound 5a (Scheme 2) by use of dendrimers as the polyvalent support. For the sake of clarity, in the reaction schemes only one site of reaction on the polyvalent support is depicted, although one of skill in the art will appreciate that multiple loading on numerous reaction sites is the norm, and is preferred.

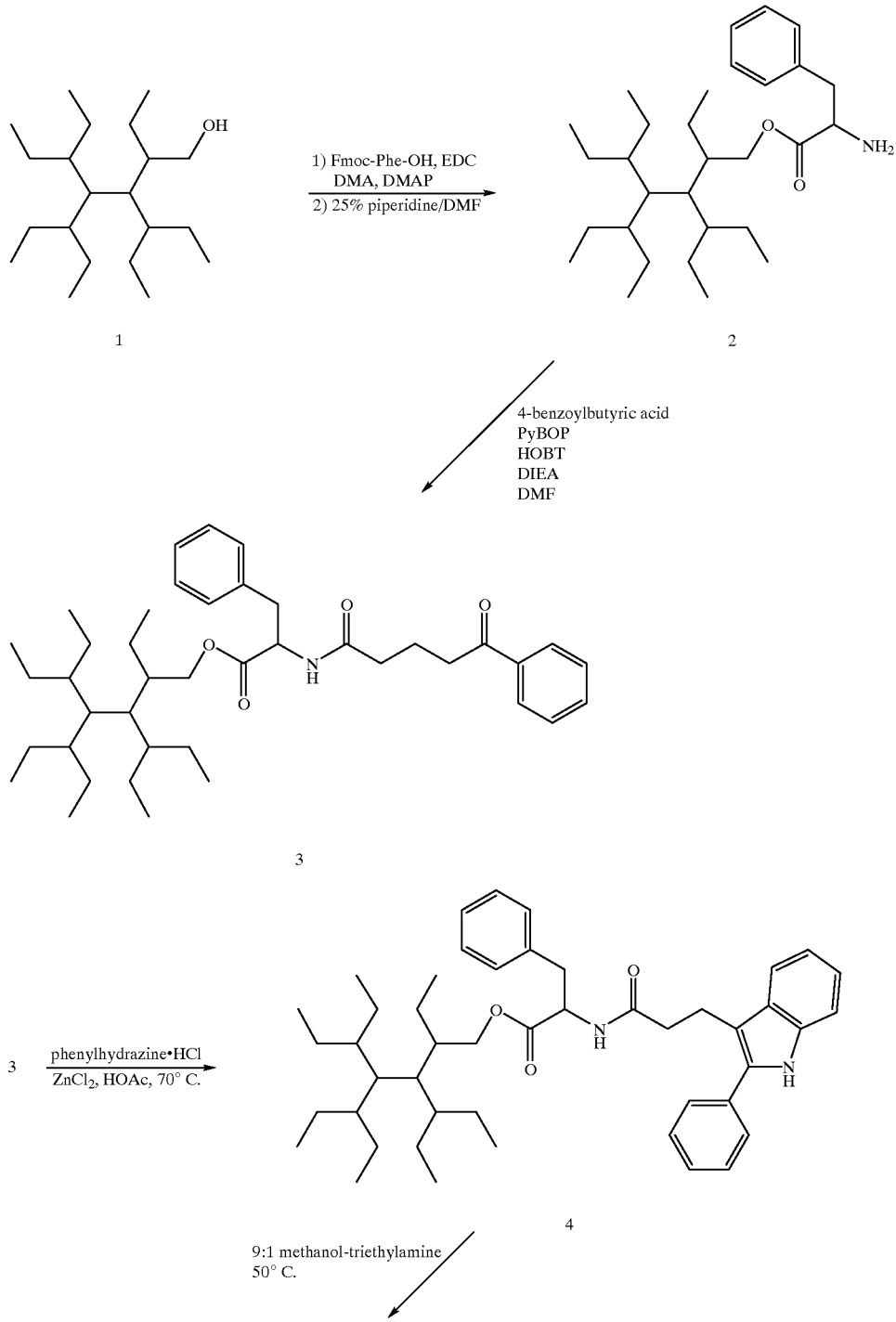

SCHEME 2

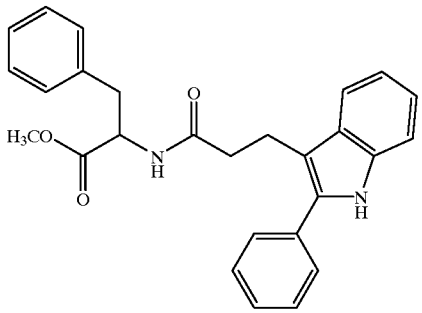

5a

The reaction sequence was initiated by loading Fmoc-protected L-phenylalanine (16 equiv. vs. 1, 2 equiv. vs. HMB linker) onto 1 using 1-ethyl-3-(3-dimethylamninopropyl)-carbodiimide hydrochloride EDC (2 equiv. vs. HMB) and catalytic 4-dimethylaminopyridine (DMAP) in DMA. Fmoc deprotection in 25% piperidine/DMF afforded 2. The amine was acylated with 4-benzoylbutyric acid (2.5 equiv.) using bromo-tris-pyrrolidino-phosphonium hexafluorophosphate PyBOP (2.5 equiv.) and N-hydroxybenztriazole HOBt (2.5 equiv.) in DMF containing Et3N to give aryl ketone 3. Cyclization with phenylhydrazine hydrochloride (0.5 M) in glacial acetic acid containing 0.5 M $ZnCl_2$ at 70° C. cleanly afforded the dendrimer-supported indole 4. Cyclizations were also performed in 10%–25% DMA/HOAc, although conversions of electron-deficient hydrazines were diminished in mixed solvents, affording the desired indole and starting ketone. Cleavage of the indole from the soluble support was achieved using 9:1 MeOH/$Et_3N$ at 50° C., yielding methyl ester 5a and regenerated 1. The cleaved product was easily isolated from the dendrimer either by GPC, or by removal of solvent, followed by extraction in MeCN and filtration of the insoluble dendrimer. Single products were characterized by HPLC, $^1H$ NMR and mass spectrometry. As listed in Table 1, all six individually prepared indoles were obtained in high purity on the first attempt at synthesis.

TABLE 1

Individually synthesized indoles

| | $R_1$ | $R_2$ | $R_3$ | Purity* |
|---|---|---|---|---|
| 5a | —$CH_2Ph$ | H | H | 99% |
| 5b | —$CH_2Ph$ | t-Bu | H | 96% |
| 5c | —$CH_2Ph$ | Cl | H | 99% |
| 5d | —$CH_2Ph$ | Cl | Cl | 84% |

TABLE 1-continued

Individually synthesized indoles

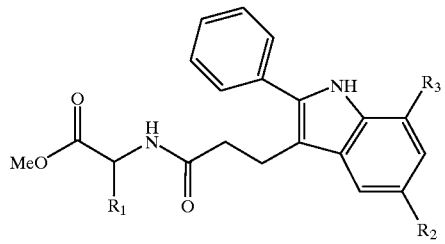

| | $R_1$ | $R_2$ | $R_3$ | Purity* |
|---|---|---|---|---|
| 5e | —$CH_2CH(CH_3)_2$ | t-Bu | H | 96% |
| 5f | —$CH_2CH(CH_3)_2$ | Cl | Cl | 91% |

*Determined by reverse-phase HPLC at 254 nm.

All dendrimeric intermediates were purified by GPC on Sephadex® LH-20, eluting with DMF; crude reaction mixtures were loaded directly onto the column with no pretreatment, except when filtration of insoluble material was warranted. Purifications were complete within 15 minutes. Reaction yields averaged greater than 90%, and columns could be reused dozens of times. $^1H$ NMR spectra of dendritic intermediates were recorded after each step, and in all cases revealed that all reagents and reaction solvents were removed during GPC, even when large excesses were employed. Furthermore, although some peak broadening was observed, the reactions could be quantitatively characterized by NMR.

With respect to $^1H$ NMR analysis of the dendritic precursors 2, 3 and 4, and product indole 5a, acyclation of 2 to form 3 was confirmed by the large downfield shift of the Phe a-proton from 3.6 to 4.5 ppm. Benzoyl protons were also observed at 7.84, 7.56 and 7.45 ppm. Conversion to the indole 4 was accompanied by the appearance of two broad triplets between 6.9–7.1 ppm which correspond to the indole H-5 and H-6 positions, and by a downfield shift of the b methylene protons from 1.7 ppm to 2.4 ppm (not shown). The ortho benzoyl protons also shifted upfield from 7.84 to 7.57 ppm upon cyclization. Indole peak integrations compared extremely well with those derived from the HMB handle (i.e. methylene at 5.1 ppm), phenylalanine (i.e. a-H at 4.5 ppm) and ketoacid (i.e. aromatic peak at 7.6 ppm), confirming that the heterocycle was formed in high yield. In addition, there was a strong correlation between the $^1H$ NMR spectra of the dendrimer-supported and the cleaved indoles 4 and 5a, as well as a complete isolation of the final product from the dendrimer.

The dendritic intermediates may also be analyzed using electrospray mass spectrometry. The LC-mass spectrum of 4 exhibits a strong molecular ion peak at 5658. With eight molecular copies synthesized per dendrimer, the presence of a dominant parent peak in the LC-mass spectrum further indicates that the indoles were formed with extremely high efficiency. Strong parent ions were also measured for PAMAM-HMB 1, and indole precursors 2 and 3. Clearly, the discrete molecular architecture of the dendrimer support was critical to obtaining mass spectral characterization.

The significance of being able to routinely characterize support-bound intermediates was exemplified in the preparation of 5d; while cyclization in 25% DMA/HOAc cleanly afforded indoles 5a and 5b upon cleavage, reaction with 2,4-dichlorophenylhydrazine hydrochloride under analogous conditions gave mostly starting ketone, as determined by the $^1$H NMR spectrum of purified dendrimer. The reaction was simply repeated on the recovered dendrimer in glacial acetic acid, and this time affording the desired indole 5d in high purity (see Table 1).

Heterogeneous Catalysis on Polyvalent Supports

Another illustrative example of the instant invention is provided by heterogeneous catalysis as generally depicted in Scheme 3.

SCHEME 3

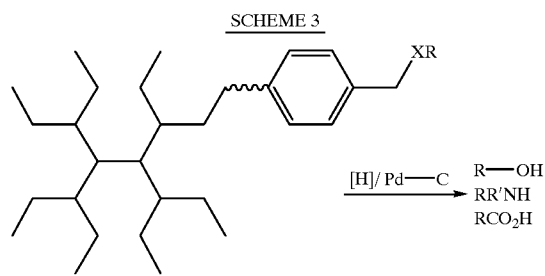

-continued

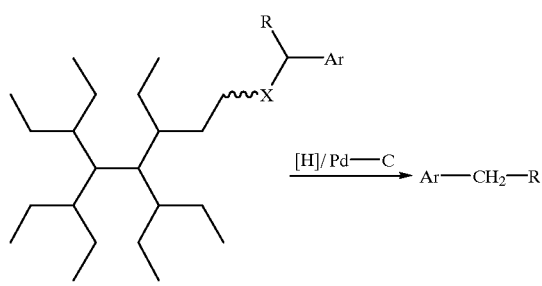

As depicted generally in Scheme 3, cleavage of compounds from dendritic supports may be readily accomplished by Pd—C mediated heterogeneous catalysis. Exemplary conditions for hydrogenolysis are as follows. To 0.01 mmol of dendrimer dissolved in 3 mL of 2:1 DMF/MeOH was added 0.4 mmol (40 equiv. per dendrimer, 5 equiv. per benzyl group) of ammonium formate and 5 mg of 10% palladium on carbon. The reaction mixture was stirred at 40–50° C. overnight, and then filtered to remove the catalyst. The cleaved product was isolated from the dendrimer by size exclusion chromatography on Sephadex LH-20 eluting with DMF.

Specific examples of heterogeneous catalysis employing a soluble polyvalent support in accordance with the present invention are depicted in Schemes 4 and 5.

SCHEME 4

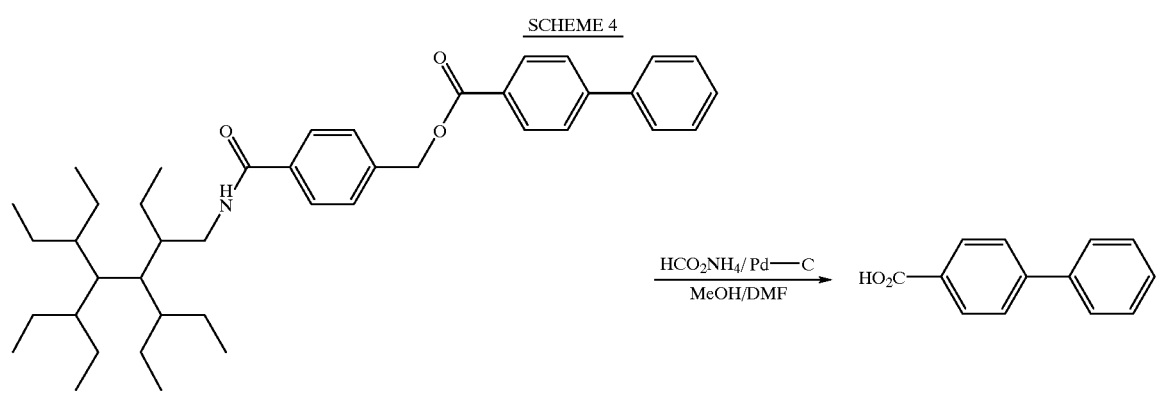

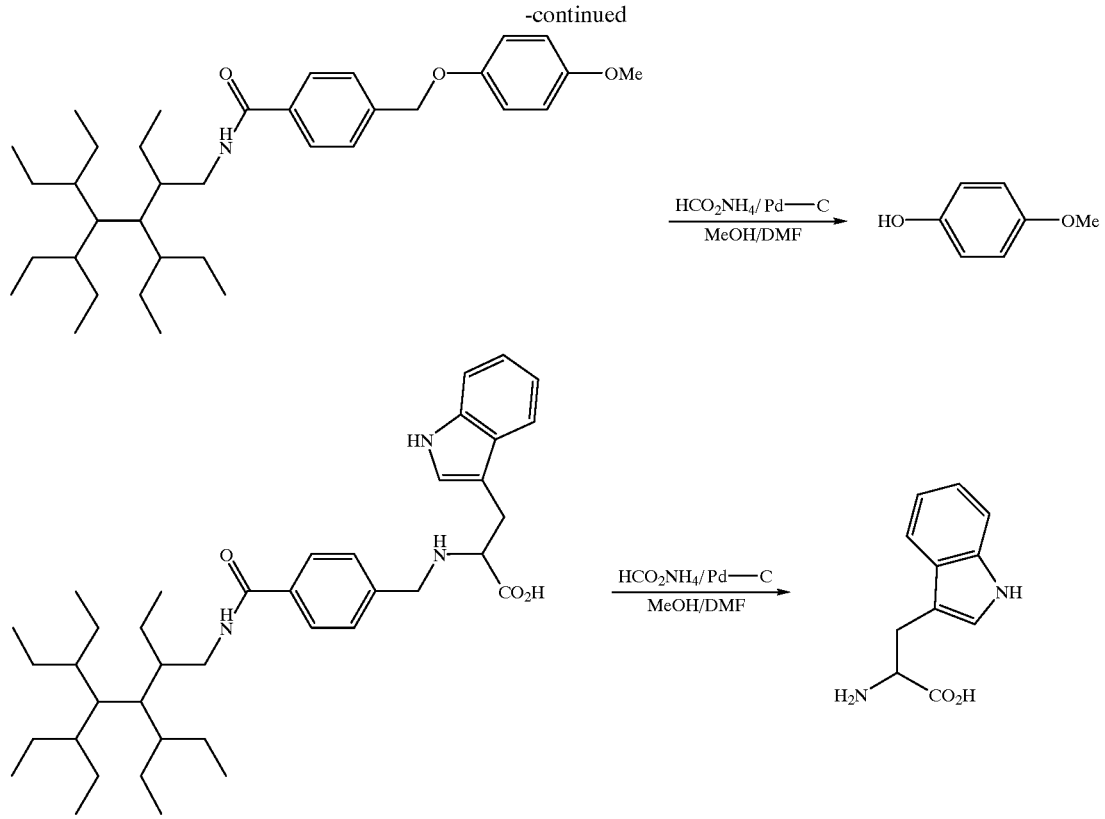
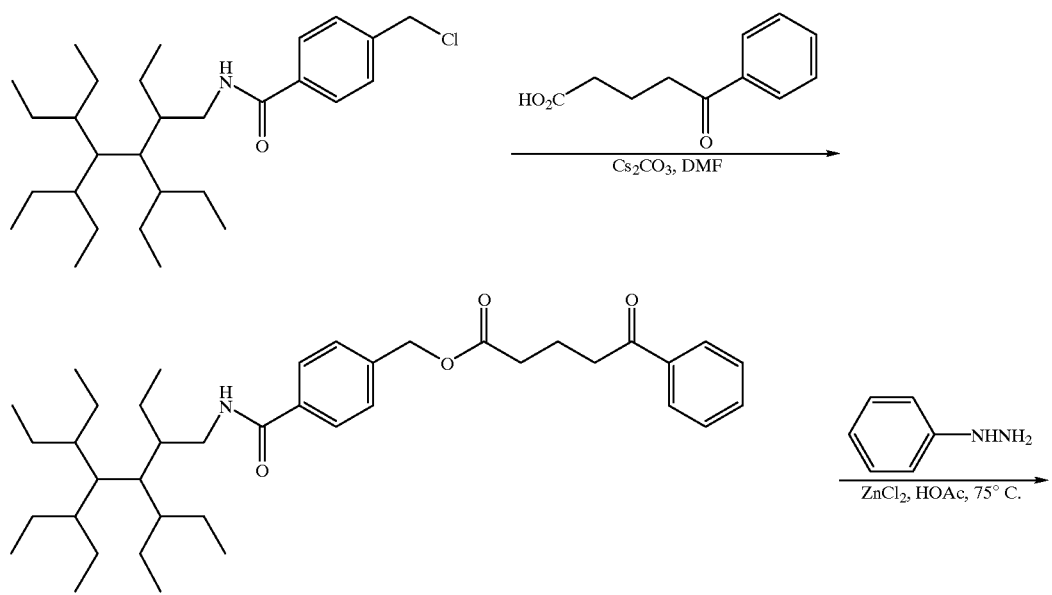
SCHEME 5

-continued

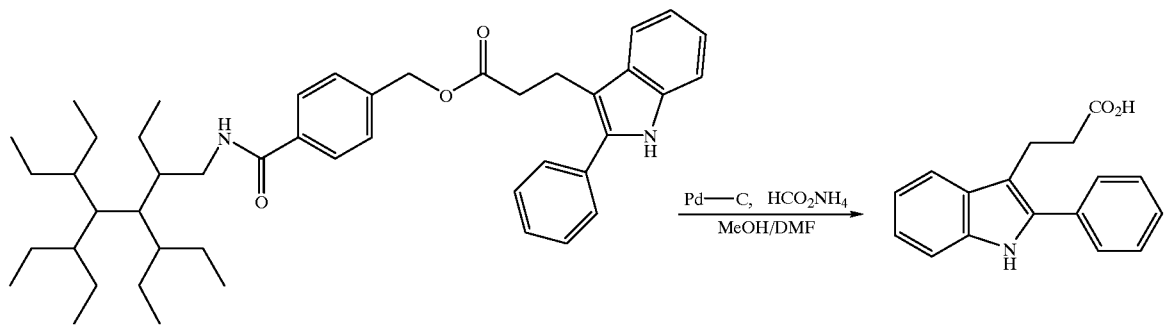

Library Synthesis on Polyvalent Supports

Requisite to combinatorial library construction using the split synthesis approach is the ability to cleanly separate mixtures of compounds from reagents and solvents (see e.g. (a) Furka, A.; Sebestyen, F.; Asgedom, M.; Dibo, G. (1991) *Int. J. Peptide Protein Res.* 37, 487–493. (b) Houghten, R. A.; Dooley, C. T. (1993) *BioMed. Chem. Lett.* 3, 405–412. (c) Erb, E.; Janda, K. D.; Brenner, S. (1994) *Proc. Natl. Acad. Sci. USA* 91, 11422–11426). In order for soluble polyvalent supports to be a viable tool for combinatorial synthes, the support-bound intermediates must be removed from reagents regardless of the identities of the compounds on the support. The investigations with soluble polyvalent supports in single compound synthesis were favorable, since GPC elution profiles of the different support-bound species were nearly identical. To further validate the present invention, a 3×3×3 (27 compound) combinatorial library was constructed by split synthesis using dendrimer supports and chemistry analogous to that presented in Scheme 2. The individual subunits are listed in Table 2.

Library construction was initiated by coupling three equal pools containing 1 with the appropriate Fmoc-protected amino acid $X_1$–$X_3$ using EDC/DMAP in DMA. The crude reaction mixtures were combined and purified by GPC, with the dendritic species eluting as a single band. The mixed amino acids were deprotected with 25% piperidine/DMF and purified by GPC. Complete acylation of 1, and the presence of the three amino acids in approximately equimolar amounts, were confirmed by $^1$H NMR. The dendrimer-protected amino acids were split into three equal portions, and acylated with ketoacids $Y_1$–$Y_3$ using PyBOP/HOBt in DMF containing diisopropylethylamine. The reaction mixtures were combined, purified, and split into three equal pools, each ideally containing nine compounds. The pools were reacted with the appropriate arylhydrazine hydrochloride $Z_1$–$Z_3$ in 9:1 HOAc/DMA containing $ZnCl_2$ at 70° C., and purified separately, yielding three mixtures containing nominally nine compounds each. The three mixtures were cleaved in 9:1 MeOH/Et$_3$N at 50° C. Removal of solvent, extraction in MeCN, and filtration of the insoluble dendrimer afforded the three sublibraries addressed in the Z axis. All three pools displayed similar HPLC patterns consisting of three smaller peaks followed by three larger peaks, with no significant side products being observed. LC-MS and single compound retention times showed that in all three sublibraries, the first three bands corresponded to Ala-modified indoles, whereas the Leu and Phe derivatives coeluted as three peaks. The generation of library constituents in roughly equimolar amounts and in high purity indicates that polyvalent supports for the construction of combinatorial libraries is a viable alternative to solid phase synthesis. In addition, the present invention is well-suited to automation, since both synthesis and purification steps are performed in solution. In addition, the extremely high loadings capable on soluble polyvalent supports (to obtain the same loading as 100 mg of resin with a typical capacity of 0.23 mmol/g, only 7.2 mg of 1 are required) would greatly facilitate the production of multimilligram quantities of compounds.

Many of the starting materials are either commercially available or known in the literature and others can be prepared following literature methods described for analogous compounds. The skills required in carrying out the reaction and purification of the resulting reaction products are known to those in the art. Purification procedures include crystallization, ultrafiltration, gel permeation chromatography (GPC), size exclusion chromatography, precipitation, centrifugation, dialysis, selective adsorption, normal phase or reverse phase chromatography.

The following examples are provided for the purpose of further illustration only and are not intended to be limitations on the disclosed invention.

EXAMPLES

Unless otherwise noted, all chemicals and reagents were purchased from commercial sources and used without further purification. Starburst™ (PAMAM) Dendrimer, Generation 1, was obtained from Aldrich as a 20% solution in MeOH, and the solvent was removed in vacuo prior to use. Dimethylformamide (DMF) was dried over 3 Å and 13x sieves. Dimethylacetamide (DMA) was dried over 3A sieves. Gel permeation chromatography (GPC) was performed on a 2.5×30 cm column using Sephadex® LH-20 as the stationary phase and DMF as the eluent (flow rate=5 mL/min). $^1$H and $^{13}$C NMR were recorded at 500 MHz on a Varian Unity 500 spectrometer. HPLC spectra were obtained on a Hewlett Packard 1090 HPLC, equiped with a reverse-phase 100×2.1 mm Hewlett-Packard ODS (5 mm) Hypersil column. A linear elution gradient was employed, consisting of 9:1 $H_2O$/MeCN (0.1% TFA) brought to 100% MeCN (0.1% TFA) over 17 min, at a constant flow rate of 0.7 mL/min. Mass spectral data were recorded using a Finnigan MAT TSQ 700 (San Jose, Calif.) triple-stage quadrupole mass spectrometer. Samples were introduced into the mass spectrometer using an ABI 130 syringe pump HPLC equipped with a Brownlee 2.1×30 mm C-4 reverse-phase HPLC column. After injection, samples were eluted directly into the mass spectrometer using a linear gradient of acetonitrile. Spectra were recorded as describe by Griffin, P. R., Coffman, J. A., Hood, L. E., and Yates, J. R., III (1991) *Int. J. Mass Spectrom. Ion Processes,* 111, 131–149.

EXAMPLE 2
PAMAM-HMB (1)

To a solution of Starburst™ (PAMAM) Dendrimer, Generation 1 (0.1 mmol, 140 mg) dissolved in 4 mL of DMA was added 4-hydroxymethylbenzoic acid (1.6 mmol, 214 mg), followed by 1-ethyl-3-(3-dimethylaminopropyl) carbodiimide EDC (1.6 mmol, 307 mg). The reaction was allowed to stir at ambient temperature for 18 h. The dendrimer product was purified by GPC. The eluent was removed by rotary evaporation, and the residue was triturated twice from $CH_2Cl_2$ and dried under vacuum, affording 240 mg of 1 as a white solid (96% yield). $^1$H NMR (500 MHz, CD3OD): δ 7.77 (d, J=8 Hz, 16H), 7.39 (d, J=8 Hz, 16H), 4.63 (s, 16H); $^{13}$C NMR (500 MHz, DMSO-$d_6$): d 172.29, 166.89, 162.86, 146.32, 133.32, 127.57, 126.50, 63.00; MS (ESI): 2503 [M+H]$^+$.

EXAMPLE 3
Dendrimer (2)

A round bottom flask containing 4.5 mL of DMA was charged with 125 mg (0.05 mmole) of dendrimer 1, 0.8 mmole (310 mg, 2 equiv. vs. HMB) of Fmoc-L-Phenylalanine, 0.8 mmole (154 mg, 2 equiv.) of EDC, and 5 mg of 4-dimethylaminopyridine (DMAP). The reaction was allowed to stir for 2.5 hours at ambient temperature, after which time an additional equivalent of Fmoc-Phe-OH and EDC were added to the stirring solution. The reaction was allowed to stir for an additional 1.5 hr, then purified by GPC. The combined fractions were concentrated to dryness, and the Fmoc protecting group was removed by treatment with 4 mL of 25% piperidine in DMF for 30 minutes. The product was purified by GPC and concentrated to dryness, yielding 159 mg of a beige foamy solid (86% overall yield). $^1$H NMR (500 MHz, 7:1 DMSO-$d_6$/$CD_3OD$): δ 7.76 (d, J=8 Hz, 16H), 7.26 (d, J=7 Hz, 16H), 7.20 (t, J=6 Hz, 16H), 7.16 (unres. t, 8H), 7.11 (d, J=6 Hz, 16H), 5.05 (s, 16H), 3.61 (m, 8H). MS (ESI): 3682 [M+H]$^+$.

EXAMPLE 4
Dendrimer (3)

To a round bottom flask containing supported amino acid 2 (0.03 mmole, 120 mg) dissolved in 4 mL of DMF was added sequentially: 0.5 mmole (99 mg, 2 equiv.) of 4-benzoylbutyric acid, 0.5 mmole (265 mg, 2 equiv.) of benzotriazole-1-yl-oxy-tris-pyrrolidino-phosphonium hexafluorophosphate (PyBOP), 0.5 mmole (70 mg, 2 equivalents) of 1-hydroxybenzotriazole hydrate (HOBt), and 1.3 mmole (225 mL, 5 equivalents) of diisopropylethylamine. The reaction was stirred for 3 hours at ambient temperature, during which time a white precipitate formed. The reaction mixture was filtered, and the filtrate was purified by GPC. The desired fractions were combined and the eluent was removed under vacuum, yielding 160 mg of a yellow solid (97% yield). $^1$H NMR (500 MHz, 7:1 DMSO-$d_6$/$CD_3OD$): δ 7.84 (d, J=6 Hz, 16H), 7.78 (d, J=7 Hz, 16H), 7.56 (unres. t, 8H), 7.45 (m, 16H), 7.28 (m, 16H), 7.12–7.22 (overlapping m, 32H), 7.11 (m, 8H), 5.08 (br. s, 16H), 4.54 (m, 8H); MS (ESI): 5075 [M+H]$^+$.

EXAMPLE 5
Dendrimer (4)

Into a round bottom flask containing 3 (0.008 mmole, 44 mg) was added a 1 mL solution of glacial acetic acid containing 0.5 mmol (72 mg) of phenylhydrazine hydrochloride and 0.5 mmol (68 mg) of zinc chloride. The reaction was heated to 70° C. and allowed to mix for 18 hours. After cooling to ambient temperature the reaction mixture was diluted with 1 mL of DMA and purified by GPC. The desired fractions were combined and concentrated to dryness, yielding 42 mg of a yellow solid (86% yield). $^1$H NMR (500 MHz, 7:1 DMSO-$d_6$/$CD_3OD$): δ 7.76 (d, J=8 Hz, 16H), 7.57 (d, J=7 Hz, 16H), 7.43 (s), 7.51 (d, J=7 Hz, 8H), 7.43 (m, 16H), 7.32 (d, J=7 Hz, 16H), 7.26 (m, 16H), 7.08–7.2 (m, 40H), 7.06 (t, J=7 Hz, 8H), 6.96 (unres. t, 8H), 5.06 (br. s, 16H), 4.53–4.56 (m, 8H); MS (ESI): 5659 [M+H]$^+$.

EXAMPLE 6

3-Phenyl-2-[3-(2-phenyl-indol-3-yl)-propionylamino]-propionic acid methyl ester (5a)

Dendrimer 4 (0.004 mmole, 22 mg) was placed into a round bottom flask along with 2 mL of 9:1 methanol-triethylamine. The suspension was heated to 50° C. and allowed to mix for 20 hours, during which time the solution became clear. The reaction mixture was concentrated to dryness and the residue was extracted with 2×4 mL of acetonitrile. The insoluble dendrimer was filtered away and the filtrate evaporated to dryness yielding 12.4 mg of a beige solid (93% yield). $^1$H NMR (500 MHz, 7:1 DMSO-d$_6$/CD$_3$OD): δ 7.59 (d, J=8 Hz, 2H), 7.53 (d, J=8 Hz, 1H), 7.46 (t, J=8 Hz, 2H), 7.34 (d, J=7 H, 1H), 7.32 (d, J=7 Hz, 1H), 7.1–7.22 (overlapping m, 5H), 7.07 (t, J=7 Hz, 1H), 6.98 (t, J=7 Hz, 1H), 4.50 (m, 1H), 3.56 (s, 3H), 2.92–3.00 (overlapping m, 3H), 2.82–2.86 (m, 1H), 2.4–2.45 (m, 2H); MS (ESI): 427.2 [M+H]$^+$.

EXAMPLE 7
Combinatorial Library Construction

To each of three samples containing PAMAM-HMB 1 (0.01 mmol, 24 mg) dissolved in 1.5 mL of DMA were added sequentially the appropriate Fmoc-protected amino acid $X_1$–$X_3$ (0.16 mmol), EDC (0.16 mmol, 31 mg), and catalytic DMAP (5 mg). The reactions were stirred at ambient temperature for 4 h, combined and purified by GPC. Solvent was removed by rotary evaporation, and the mixed amino acids were deprotected in 4 mL of 25% piperidine/DMA for 30 min. Purification by GPC and removal of solvent in vacuo afforded 83 mg PAMAM-HMB-$X_{1-3}$ as a yellow foam (84% yield from 1 based on average molecular weight of products).

PAMAM-HMB-$X_{1-3}$ was split into three equal pools containing 7.4 mmol (25 mg) of dendrimer in 1.5 mL of DMF. To each pool was added sequentially the appropriate ketoacid $Y_1$–$Y_3$ (0.15 mmol), PyBOP (0.15 mmol, 78 mg), HOBt (0.15 mmol, 21 mg) and diisopropylethylamine (0.3 mmol, 52 mL). The reactions were stirred at ambient temperature for 4 h, after which time the ninhydrin test of Kaiser was negative for the three reactions (see Kaiser, E.; Colescott, R. L.; Bossinger, C. D.; Cook, P. I. (1979) *Anal. Biochem.* 34, 595–598). The crude reaction mixtures were combined and purified by GPC. Removal of solvent in vacuo afforded 104 mg of a tan foamy solid (98% yield).

PAMAM-HMB-$X_{1-3}$-$Y_{1-3}$ was split into three equal pools containing 7.0 mmol (25 mg) of dendrimer in 2.0 mL of 9:1 HOAc/DMA. To each pool was added the appropriate hydrazine hydrochloride $Z_1$–$Z_3$ (1.0 mmol) and ZnCl$_2$ (1.0 mmol, 136 mg). The reactions were stirred at 70° C. for 20 h. The mixtures were purified separately by GPC and concentrated to dryness in vacuo. Results from single compound synthesis indicated that p-chlorophenylhydrazine hydrochloride $Z_3$ would not fully cyclize under the above conditions, so the reaction was repeated on the recovered $Z_3$-treated dendrimer in glacial acetic acid as described above. Yields: PAMAM-HMB-$X_{1-3}$-$Y_{1-3}Z_1$, 75%; PAMAM-HMB-$X_{1-3}$-$Y_{1-3}Z_2$, 83%; PAMAM-HMB-$X_{1-3}$-$Y_{1-3}Z_3$, 66%.

Each of the three sublibraries was cleaved from the dendrimer support in 3 mL of 9:1 MeOH/Et$_3$N at 50° C. for 18 h. Eluent was removed under vacuum, and the residues were extracted twice with 4 mL of MeCN. Insoluble dendrimer was removed by filtration, and the filtrates were concentrated to dryness, affording the indole sublibraries. Yields: $X_{1-3}$-$Y_{1-3}Z_1$, 90%; $X_{1-3}$-$Y_{1-3}$-$Z_2$, 96%; $X_{1-3}$-$Y_{1-3}$-$Z_3$, 90%.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. For example, reaction conditions other than the particular conditions as set forth herein above may be applicable as a consequence of variations in the reagents or methodology to prepare the compounds from the processes of the invention indicated above. Likewise, the specific reactivity of starting materials may vary according to and depending upon the particular substituents present or the conditions of manufacture, and such expected variations or differences in the results are contemplated in accordance with the objects and practices of the present invention. It is intended, therefore, that the invention be defined by the scope of the claims which follow and that such claims be interpreted as broadly as is reasonable.

What is claimed is:

1. A process for the preparation of a combinatorial library of compounds comprising the steps of preparing in solution a mixture of synthons, intermediates, or products which are attached to a soluble polyvalent support and separating the mixture of synthons, intermediates, or products which are attached to a soluble polyvalent support from the reaction media in solution by a size-selective method.

2. The process as recited in claim 1, wherein the size-selective method is selected from the group consisting of gel permeation chromatography, size-exclusion chromatography, and ultrafiltration.

3. The process as recited in claim 1, wherein the size-selective method is gel permeation chromatography.

4. The process as recited in claim 1, wherein the size-selective method is size-exclusion chromatography.

5. The process as recited in claim 1, wherein the size-selective method is ultrafiltration.

6. The process as recited in claim 1, wherein the soluble polyvalent support is selected from the group consisting of dendrimers, dendrons, cascade polymers, arborols, oligomers, and block copolymers.

7. The process as recited in claim 1, wherein the soluble polyvalent support is selected from the group consisting of dendrimers, dendrons, cascade polymers, and arborols.

8. The process as recited in claim 1, wherein the soluble polyvalent support is selected from the group consisting of dendrimers and dendrons.

9. The process as recited in claim 1, wherein the soluble polyvalent support is selected from the group consisting of poly(amidoamine) dendrimers.

10. The process as recited in claim 1 wherein the soluble polyvalent support is poly(amidoamino)-p-(hydroxymethyl) benzamide dendrimer.

11. A process for the preparation of a combinatorial library of compounds which comprises:

(a) attaching a first synthon to a soluble polyvalent support in solution to form a support-bound synthon dissolved in the reaction media;

(b) separating the support-bound synthon from the reaction media;

(c) mixing the support-bound synthon with one or more different support-bound synthons to form a pool of support-bound synthons;

(d) reacting the pool of support-bound synthons in solution with another synthon to form a pool of support-bound products dissolved in the reaction media; and (e) separating the pool of support-bound products from the reaction media, wherein the pool of support-bound products of step (e) are separated from the reaction media in solution by a size-selective method.

12. The process of claim 11 which further comprises the step of (f) cleaving the pool of support-bound products from the soluble polyvalent support to form a pool of cleaved products.

13. The process of claim 12 which further comprises the step of (g) separating the pool of cleaved products from the soluble polyvalent support.

14. The process of claim 11 wherein steps (c) through (e) inclusive are repeated one or more times, and the support-bound product of step (e) is used as the support-bound synthon in the repeated step (c).

15. The process of claim 11 wherein the order of steps (b) and (c) is interchanged.

16. The process of claim 11, wherein the size-selective method is selected from the group consisting of ultrafiltration, gel permeation chromatography (GPC), and size exclusion chromnatography.

17. The process as recited in claim 11, wherein the size-selective method is gel permeation chromatography.

18. The process as recited in claim 11, wherein the size-selective method is size-exclusion chromatography.

19. The process as recited in claim 11, wherein the size-selective method is ultrafiltration.

20. The process as recited in claim 11, wherein the soluble polyvalent support is selected from the group consisting of dendrimers, dendrons, cascade polymers, arborols, oligomers, and block copolymers.

21. The process as recited in claim 11, wherein the soluble polyvalent support is selected from the group consisting of dendrimers, dendrons, cascade polymers, and arborols.

22. The process as recited in claim 11, wherein the soluble polyvalent support is selected from the group consisting of dendrimers and dendrons.

23. The process as recited in claim 11, wherein the soluble polyvalent support is selected from the group consisting of poly(amidoamine) dendrimers.

24. The process as recited in claim 11, wherein the soluble polyvalent support is poly(amidoamino)-p-(hydroxymethyl) benzamide dendrimer.

* * * * *